(12) United States Patent
Grunthaner et al.

(10) Patent No.: US 9,891,759 B2
(45) Date of Patent: Feb. 13, 2018

(54) FRUSTRATED TOTAL INTERNAL REFLECTION AND CAPACITIVE SENSING

(71) Applicant: Apple Inc., Cupertino, CA (US)

(72) Inventors: Martin P. Grunthaner, Mountain View, CA (US); Peter W. Richards, San Francisco, CA (US); Romain A. Teil, San Francisco, CA (US); Steven P. Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 598 days.

(21) Appl. No.: 13/631,226

(22) Filed: Sep. 28, 2012

(65) Prior Publication Data

US 2014/0092052 A1 Apr. 3, 2014

(51) Int. Cl.
  *G06F 3/044* (2006.01)
  *G06F 3/041* (2006.01)
  *G06F 3/042* (2006.01)

(52) U.S. Cl.
  CPC .......... *G06F 3/044* (2013.01); *G06F 3/0416* (2013.01); *G06F 3/0421* (2013.01); *G06F 2203/04105* (2013.01); *G06F 2203/04106* (2013.01); *G06F 2203/04109* (2013.01)

(58) Field of Classification Search
  CPC . G06F 2203/04109; G06F 3/044; G06F 3/042
  See application file for complete search history.

(56) References Cited

U.S. PATENT DOCUMENTS

| 4,675,569 A | 6/1987 | Bowman et al. |
| 5,917,165 A | 6/1999 | Platt et al. |
| 6,002,389 A | 12/1999 | Kasser |
| 6,333,768 B1 * | 12/2001 | Kawashima et al. ......... 348/806 |
| 7,114,402 B2 | 10/2006 | Winkler et al. |

(Continued)

FOREIGN PATENT DOCUMENTS

| EP | 2315102 | 4/2011 |
| WO | WO 97/018528 | 5/1997 |
| WO | WO 11/156447 | 12/2011 |

OTHER PUBLICATIONS

U.S. Appl. No. 13/624,855, filed Sep. 21, 2012, Leung et al.

(Continued)

*Primary Examiner* — Nelson Rosario
*Assistant Examiner* — Chun-Nan Lin
(74) *Attorney, Agent, or Firm* — Brownstein Hyatt Farber Schreck, LLP

(57) ABSTRACT

Detecting force and touch using FTIR and capacitive location. FTIR determines applied force by the user's finger within infrared transmit lines on a touch device. A pattern of such lines determine optical coupling with the touch device. Capacitive sensing can determine (A) where the finger actually touches, so the touch device more accurately infers applied force; (B) whether finger touches shadow each other; (C) as a baseline for applied force; or (D) whether attenuated reflection is due to a current optical coupling, or is due to an earlier optical coupling, such as a smudge on the cover glass. If there is attenuated reflection without actual touching, the touch device can reset a baseline for applied force for the area in which that smudge remains. Infrared transmitters and receivers are positioned where they are not visible to a user, such as below a frame or mask for the cover glass.

20 Claims, 5 Drawing Sheets

(56) References Cited

U.S. PATENT DOCUMENTS

| | | | |
|---|---|---|---|
| 7,211,885 B2 | 5/2007 | Nordal et al. | |
| 8,115,753 B2 | 2/2012 | Newton | |
| 8,169,332 B2 | 5/2012 | Bernstein et al. | |
| 8,199,122 B2 | 6/2012 | Yamamoto et al. | |
| 8,209,628 B1 | 6/2012 | Davidson | |
| 8,259,240 B2 | 9/2012 | Han | |
| 8,274,495 B2 | 9/2012 | Lee | |
| 8,334,849 B2 | 12/2012 | Murphy et al. | |
| 8,547,350 B2 | 10/2013 | Anglin et al. | |
| 2003/0026513 A1* | 2/2003 | Deliwala | 385/2 |
| 2004/0184023 A1* | 9/2004 | Kao | G01C 3/08 356/4.01 |
| 2004/0189612 A1* | 9/2004 | Bottari et al. | 345/173 |
| 2006/0033636 A1* | 2/2006 | Kwong et al. | 340/825.72 |
| 2007/0125937 A1* | 6/2007 | Eliasson | G06F 3/0414 250/221 |
| 2008/0007541 A1* | 1/2008 | Eliasson | G06F 3/0421 345/176 |
| 2008/0029691 A1* | 2/2008 | Han | G06F 3/04883 250/224 |
| 2008/0089699 A1* | 4/2008 | Li et al. | 398/197 |
| 2008/0284925 A1* | 11/2008 | Han | G06F 3/0425 349/12 |
| 2009/0015564 A1 | 1/2009 | Ye et al. | |
| 2009/0102296 A1* | 4/2009 | Greene et al. | 307/149 |
| 2009/0103853 A1* | 4/2009 | Daniel | G02B 6/0068 385/13 |
| 2009/0243817 A1 | 10/2009 | Son | |
| 2010/0001962 A1* | 1/2010 | Doray | G06F 3/0317 345/173 |
| 2010/0128002 A1 | 5/2010 | Stacy et al. | |
| 2010/0177060 A1* | 7/2010 | Han | G06F 3/0412 345/174 |
| 2010/0302185 A1* | 12/2010 | Han | G06F 3/042 345/173 |
| 2010/0315360 A1 | 12/2010 | Lee | |
| 2011/0096025 A1* | 4/2011 | Slobodin et al. | 345/174 |
| 2011/0122075 A1* | 5/2011 | Seo et al. | 345/173 |
| 2011/0141052 A1 | 6/2011 | Bernstein et al. | |
| 2011/0221997 A1* | 9/2011 | Kim | G06F 3/0428 349/62 |
| 2011/0248941 A1 | 10/2011 | Abdo et al. | |
| 2012/0038577 A1 | 2/2012 | Brown et al. | |
| 2012/0090757 A1 | 4/2012 | Buchan et al. | |
| 2012/0182266 A1* | 7/2012 | Han | G06F 3/0425 345/175 |
| 2012/0200532 A1 | 8/2012 | Powell et al. | |
| 2013/0016066 A1* | 1/2013 | Chen et al. | 345/175 |
| 2013/0285977 A1* | 10/2013 | Baharav | G06F 3/0414 345/174 |
| 2014/0320460 A1* | 10/2014 | Johansson | G06F 3/0414 345/175 |

OTHER PUBLICATIONS

U.S. Appl. No. 13/676,992, filed Nov. 14, 2012, Leung et al.
U.S. Appl. No. 13/958,430, filed Aug. 2, 2013 Shahparnia et al.
Bau, et al., "TeslaTouch: Electrovibration for Touch Surfaces," UIST'10, Oct. 3-6, 2010, New York, New York USA, 10 pages.
Feist, "Samsung snags patent for new pressure sensitive touch-screens," posted on AndroidAuthority.com at URL: http://www.androidauthority.com/samsung-patent-pressure-sensitive-touch-screens-354860, Mar. 7, 2014, 1 page.

* cited by examiner

FRUSTRATED TOTAL INTERNAL REFLECTION AND CAPACITIVE SENSING

BACKGROUND

Field of the Disclosure

This application generally relates to force sensing using frustrated total internal reflection (FITR) and capacitive techniques, and other matters.

Background of the Disclosure

Touch devices generally provide for identification of positions where the user touches the device, including movement, gestures, and other effects of position detection. For a first example, touch devices can provide information to a computing system regarding user interaction with a graphical user interface (GUI), such as pointing to elements, reorienting or repositioning those elements, editing or typing, and other GUI features. For a second example, touch devices can provide information to a computing system suitable for a user to interact with an application program, such as relating to input or manipulation of animation, photographs, pictures, slide presentations, sound, text, other audiovisual elements, and otherwise.

It sometimes occurs that, when interfacing with a GUI, or with an application program, it would be advantageous for the user to be able to indicate an amount of force applied when manipulating, moving, pointing to, touching, or otherwise interacting with, a touch device. For a first example, it might be advantageous for the user to be able to manipulate a screen element or other object in a first way with a relatively lighter touch, or in a second way with a relatively more forceful or sharper touch. In one such case, it might be advantageous if the user could move a screen element or other object with a relatively lighter touch, while the user could alternatively invoke or select that same screen element or other object with a relatively more forceful or sharper touch. For a second example, it might be advantageous for the user to be able to provide input in multiple ways depending in an amount of touch, such as a first way for a light touch, a second way for a medium touch, and a third way for a heavy touch. Similarly, "multiple ways depending in an amount of touch" might include any particular number of ways, that is, not just two or three. For a third example, it might be advantageous for the user to be able to provide input with an analog control in response to an amount of force, such as a gas pedal on a simulated car, or a control surface of an airplane in a flight simulator. For a fourth example, it might be advantageous for the user to be able to provide input, such as simulated body movements or otherwise, in a virtual reality (VR) simulation (possibly with haptic feedback), or in an augmented reality program.

Some touch devices are able to determine a location of touch, or multiple locations for more than one touch. For example, the Multitouch 3200, marketed by FlatFrog Laboratories AB of Lund, Sweden, uses "Planar Scatter Detection" technology. Light is injected into a waveguide, travels via total internal reflection within the waveguide, and is disturbed by an object (such as a finger) touching the waveguide, resulting in FTIR ("Frustrated Total Internal Reflection"), from which the location of the touch can be determined by software. Light can also be scattered by the touch, which might also provide a source of information about the touch. For example, a tabletop touch product called "Surface", marketed by Microsoft Corporation of Redmond, Wash., includes an FTIR tabletop, with cameras mounted behind it that detect light refracted by pressure.

RAPT Technology of Dublin, Ireland also markets a touch-sensitive input device. Perceptive Pixel, owned by Microsoft Corporation of Redmond, Wash., markets a multi-touch sensing device that uses FTIR, and which is said to use a force-sensitive technique. Peratech, of Rich-mond, UK markets a technology that uses a "quantum tunneling composite" material, which has a variable resistance in response to pressure, using a polymer embedded with spiky conductive metallic particles.

Each of these examples, as well as other possible considerations, can cause one or more difficulties for the touch device, at least in that inability to determine an amount of force applied by the user when contacting the touch device might cause a GUI or an application program to be unable to provide functions that would be advantageous. When such functions are called for, inability to provide those functions may subject the touch device to lesser capabilities, to the possible detriment of the effectiveness and value of the touch device. On the other hand, having the ability to provide those functions might provide the touch device with greater capabilities, to the possible advantage of the effectiveness and value of the touch device.

BRIEF SUMMARY OF THE DISCLOSURE

This application provides techniques, including circuits and designs, which can determine amounts of force applied, and changes in amounts of force applied, by the user when contacting a touch device (such as a touch pad or touch display). These techniques can be incorporated into devices using touch recognition, touch elements of a GUI, and touch input or manipulation in an application program. This application also provides techniques, including devices that apply those techniques, which can determine amounts of force applied, and changes in amounts of force applied, by the user when contacting a touch device, and in response thereto, provide additional functions available to a user of a touch device.

In one embodiment, techniques can include providing a force sensitive sensor incorporated into a touch device. For example, the force sensitive sensor can be disposed below a surface of a cover glass (CG), and can detect applied force and touching of the cover glass using one or more of: infrared techniques, including frustrated total internal reflection (FTIR), capacitive techniques, including capacitive location sensing, and otherwise. For example, infrared light can be emitted so that it reflects between an interface between a surface of the cover glass and another surface (a "top surface" of the cover glass) and an interface between a surface of the cover glass and another element in the touch device (a "bottom surface" of the cover glass). Transmission of the infrared light is substantially totally reflected when the interface at the top surface is between the cover glass and air, while transmission is substantially attenuated when the interface at the top surface is between the cover glass and a user's finger (or other body part).

In one embodiment, measurement of internal reflection allows a processor or other computing device in the touch device to determine, to within a line on which the infrared light is transmitted, where on the top surface the user's finger is applying force to the touch device. A pattern of such lines allows the touch device to determine an area of the user's finger is touching the top surface, a number of fingerprint ridges are touching the top surface, a degree of wetting exists between the user's finger and the top surface, a total optical coupling between the user's finger and the top surface, or other measurements from which an amount of applied force, by the user's finger to the top surface, can be inferred.

In one embodiment, capacitive sensing of touching of the touch device by the user's finger (or other body part) can be used to determine specifically where on the top surface of the user's finger is actually touching the touch device. This has the effect that the touch device can make a more accurate determination of the area of the user's finger that is touching the top surface, and other measurements from which the amount of applied force can be inferred. This also has the effect that the touch device can identify those locations that are being touched by the user's finger, and which are in more than one line on which infrared light is transmitted, with the effect that the touch device can make a more accurate determination of whether the user is touching the touch device with one heavy touch (indicating a relatively larger amount of applied force), or whether the user is touching the touch device with two or more lighter touches (indicating two or more relatively lighter amounts of applied force in different locations).

In one embodiment, capacitive sensing of touching of the touch device by the user's finger (or other body part) can be used to determine whether attenuated reflection ("frustrated internal reflection" or "FTIR") is due to a current optical coupling between the user's finger and the top surface, or is due to an earlier optical coupling, such as an earlier touching that smudged or wetted the cover glass, or otherwise left an optical imprint that still attenuates reflection. If attenuated reflection is detected, but capacitive sensing indicates lack of actual touching, a processor or other computing device in the touch device can determine that the attenuated reflection is not due to any applied force, and can reset a baseline for applied force for the area in which that smudge, wetting, or other optical imprint remains. Similarly, capacitive sensing can be used to determine a baseline for zero applied force, even if there is a nonzero degree of attenuated reflection.

In one embodiment, techniques include integrating one or more infrared transmitters and one or more infrared receivers into a device stack that forms the touch device. For example, the device stack can include the cover glass, one or more display elements, the one or more capacitive sensing elements, and one or more intermediate layers (that separate the elements in the display stack, or that couple or glue the elements in the display stack).

In one embodiment, the infrared transmitters and receivers are positioned below an edge of the cover glass, or below a frame element which holds the cover glass, with the effect that the infrared transmitters and receivers are not visible through the cover glass to a user of the touch device. For example, with infrared transmitters and receivers positioned below an edge of the cover glass, or below a black mask that is deposited onto a surface below the cover glass, the user of the touch device cannot see the infrared transmitters or receivers due to lack of any optically clear path between the user's eye and the infrared transmitters or receivers.

In one embodiment, the infrared transmitters and receivers are integrated into the OLED display as a "fourth color", infrared, which is not visible to the user of the touch device because the human eye does not have any sensors for infrared light. This allows the infrared transmitters to transmit infrared light without the user's eye detecting that activity. Similarly, both the infrared transmitters and receivers are also not visible to the user's eye because the infrared transmitters and receivers are integrated into the OLED display, so they are outshone by the display (when color or greyscale display is present for those display elements they are integrated into) or they appear black (when color or greyscale display is not present for those display elements they are integrated into).

In one embodiment, the infrared transmitters and receivers are positioned to a side of the cover glass, or below an opaque substrate positioned below the cover glass. For a first example, the infrared transmitters and receivers can be positioned so that infrared light is emitted and received at an angle from a side of the cover glass. This would have the effect that the user's eye cannot see the infrared transmitters or receivers due to lack of any optically clear path between the user's eye and the infrared transmitters or receivers. For a second example, the infrared transmitters and receivers can be positioned so that infrared light passes through vias in the opaque substrate below the cover glass, or alternatively, the substrate below the cover glass can be constructed to be opaque to visible light but substantially transmissive to infrared light. This would have the effect that the user cannot see the infrared transmitters or receivers, due to lack of any optically clear path between the user's eye and the infrared transmitters or receivers.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE FIGURES

While the specification concludes with claims particularly pointing out and distinctly claiming the subject matter that is regarded as forming the present disclosure, it is believed that the disclosure will be better understood from the following description taken in conjunction with the accompanying Figures, in which:

DETAILED DESCRIPTION

Terminology

Figure 1:
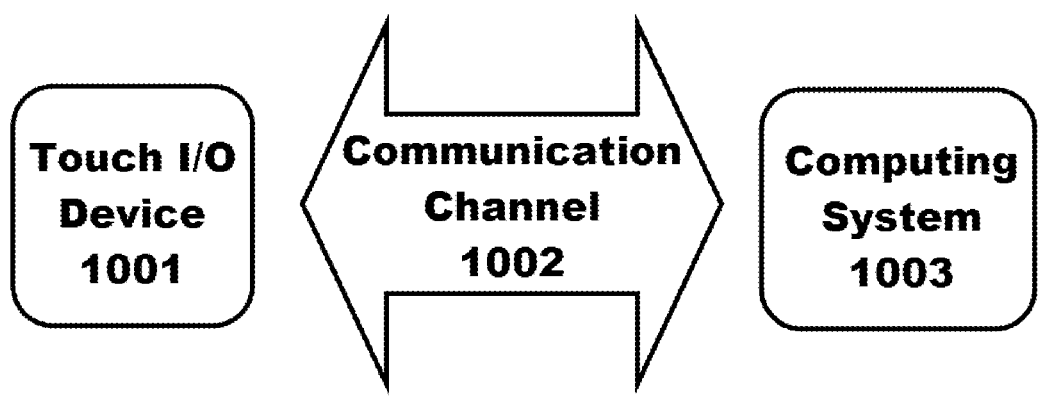
FIG. 1 shows a conceptual drawing of communication between a touch I/O device and a computing system.

The following terminology is exemplary, and not intended to be limiting in any way.

The text "applied force", and variants thereof, generally refers to a degree or measure of an amount of force being applied to a device. The degree or measure of applied force need not have any particular scale. For example, the measure of applied force can be linear, logarithmic, or otherwise nonlinear, and can be adjusted periodically (or otherwise, such as aperiodically, or otherwise from time to time) in response to one or more factors, either relating to applied force, location of touch, time, or otherwise.

The text "attenuated reflection", and variants thereof, generally refers to a degree or measure of reflection less than 100% reflection, such as might occur at an interface where reflection of a transmitted signal is less than 100% reflection. For a first example, attenuated reflection can occur if the interface between two elements does not provide for 100% reflection. The text "frustrated total internal reflection", "FTIR", and variants thereof, generally refers to a circumstance in which attenuated reflection is caused or enhanced by an alteration in the degree or measure of reflection. For a second example, FTIR can occur if the interface between two elements is altered (such as by a touch by a user's finger or other body part), or if the interface between two elements has been earlier altered (such as by a smudge or wetting that occurred in the past and has persisted).

The text "force sensing element", and variants thereof, generally refers to one or more data elements of any kind, including information sensed with respect to applied force, whether at individual locations or otherwise. For example and without limitation, a force sensing element can include data or other information with respect to a relatively small region of where a user is forcibly contacting a device.

The text "touch sensing element", and variants thereof, generally refers to one or more data elements of any kind, including information sensed with respect to individual locations. For example and without limitation, a touch sensing element can include data or other information with respect to a relatively small region of where a user is contacting a touch device.

The text "user's finger", and variants thereof, generally refers to a user's finger, or other body part, or a stylus or other device, such as when used by a user to apply force to a touch device, or to touch a touch device. For example and without limitation, a "user's finger" can include any part of the user's finger, the user's hand, a covering on the user's finger, a soft or hard stylus, a light pen or air brush, or any other device used for pointing, touching, or applying force to, a touch device or a surface thereof.

After reading this application, those skilled in the art would recognize that these statements of terminology would be applicable to techniques, methods, physical elements, and systems (whether currently known or otherwise), including extensions thereof inferred or inferable by those skilled in the art after reading this application.

Force Sensitive Device and System

FIG. 1 shows a conceptual drawing of communication between a touch I/O device and a computing system.

Figure 2:
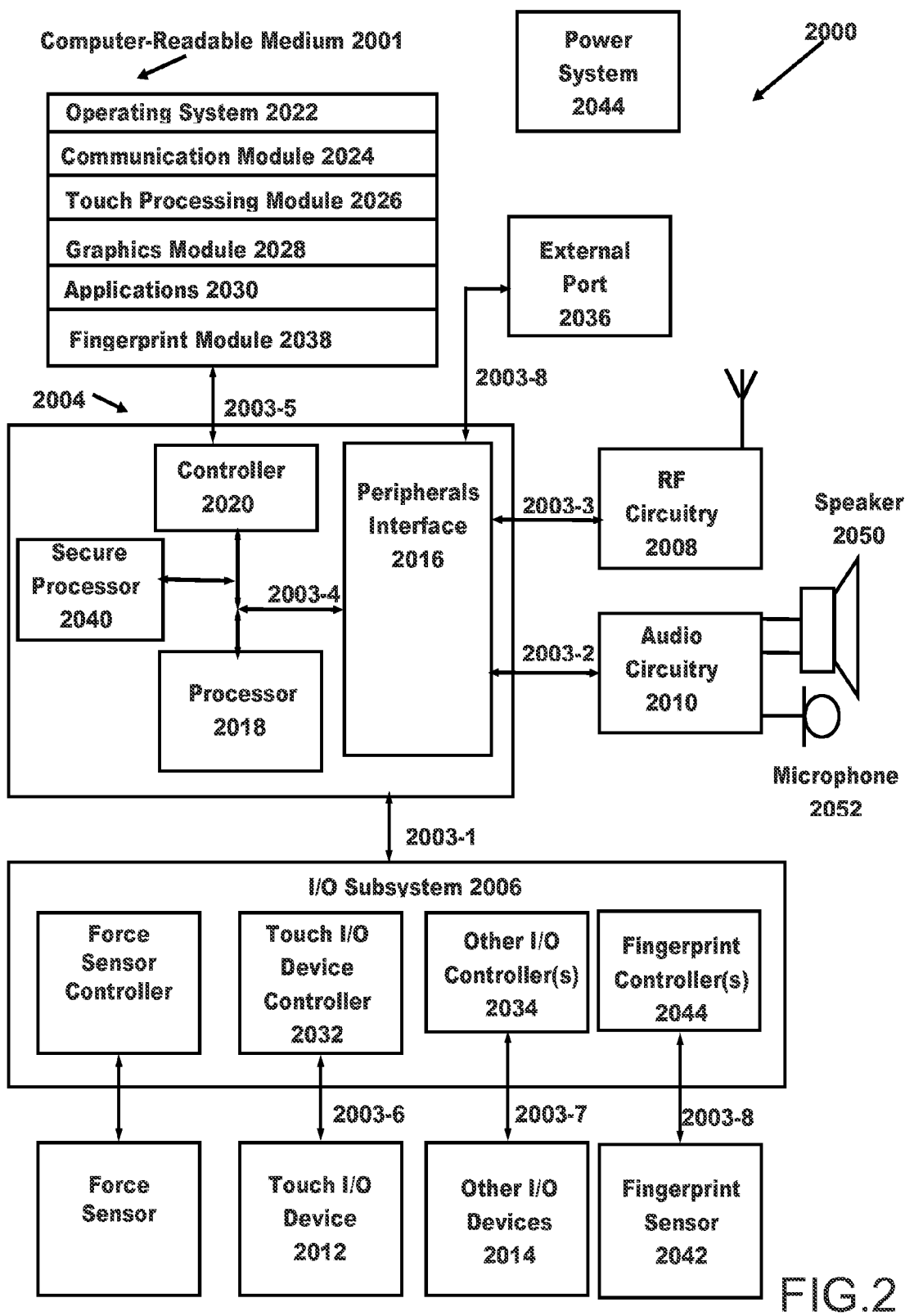
FIG. 2 shows a conceptual drawing of a system including a force sensitive touch device.

FIG. 2 shows a conceptual drawing of a system including a force sensitive touch device.

Described embodiments may include touch I/O device 1001 that can receive touch input and force input (such as possibly including touch locations and applied force at those locations) for interacting with computing system 1003 (such as shown in the FIG. 1) via wired or wireless communication channel 1002. Touch I/O device 1001 may be used to provide user input to computing system 1003 in lieu of or in combination with other input devices such as a keyboard, mouse, or possibly other devices. In alternative embodiments, touch I/O device 1001 may be used in conjunction with other input devices, such as in addition to or in lieu of a mouse, trackpad, or possibly another pointing device. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive and force sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard, disposed on a trackpad or other pointing device), any multi-dimensional object having a touch sensitive surface for receiving touch input, or another type of input device or input/output device.

In one example, touch I/O device 1001 embodied as a touch screen may include a transparent and/or semitransparent touch sensitive and force sensitive panel at least partially or wholly positioned over at least a portion of a display. (Although the touch sensitive and force sensitive panel is described as at least partially or wholly positioned over at least a portion of a display, in alternative embodiments, at least a portion of circuitry or other elements used in embodiments of the touch sensitive and force sensitive panel may be at least positioned partially or wholly positioned under at least a portion of a display, interleaved with circuits used with at least a portion of a display, or otherwise.) According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive and force sensitive components/devices are integral with display components/devices. In still other embodiments a touch screen may be used as a supplemental or additional display screen for displaying supplemental or the same graphical data as a primary display and to receive touch input, including possibly touch locations and applied force at those locations.

Touch I/O device 1001 may be configured to detect the location of one or more touches or near touches on device 1001, and where applicable, force of those touches, based on capacitive, resistive, optical, acoustic, inductive, mechanical, chemical, or electromagnetic measurements, in lieu of or in combination or conjunction with any phenomena that can be measured with respect to the occurrences of the one or more touches or near touches, and where applicable, force of those touches, in proximity to device 1001. Software, hardware, firmware or any combination thereof may be used to process the measurements of the detected touches, and where applicable, force of those touches, to identify and track one or more gestures. A gesture may correspond to stationary or nonstationary, single or multiple, touches or near touches, and where applicable, force of those touches, on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, consecutively, or otherwise. A gesture may be characterized by, but is not limited to a pinching, sliding, swiping, rotating, flexing, dragging, tapping, pushing and/or releasing, or other motion between or with any other finger or fingers, or any other portion of the body or other object. A single gesture may be performed with one or more hands, or any other portion of the body or other object by one or more users, or any combination thereof.

Computing system 1003 may drive a display with graphical data to display a graphical user interface (GUI). The GUI may be configured to receive touch input, and where applicable, force of that touch input, via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs or dials, virtual buttons, virtual levers, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input, and where applicable, force of that touch input, on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches, and where applicable, force of those touches, on touch I/O device 1001. Feedback may be transmitted optically, mechanically, electrically, olfactory, acoustically, haptically, or the like or any combination thereof and in a variable or non-variable manner.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other (portable or non-portable) system or device adaptable to the inclusion of system architecture 2000, including combinations of two or more of these types of devices. FIG. 2 shows a block diagram of one embodiment of system 2000 that generally includes one or more computer-readable mediums 2001, processing system 2004, Input/Output (I/O) subsystem 2006, electromagnetic frequency circuitry, such as possibly radio frequency (RF) or other frequency circuitry 2008 and audio circuitry 2010. These components may be coupled by one or more communication buses or signal lines 2003. Each such bus or signal line may be denoted in the form 2003-X, where X can be a unique number. The bus or signal line may carry data of the appropriate type between components; each bus or signal line may differ from other buses/lines, but may perform generally similar operations.

It should be apparent that the architecture shown in FIGS. 1-2 is only one example architecture of system 2000, and that system 2000 could have more or fewer components than shown, or a different configuration of components. The various components shown in FIGS. 1-2 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch and applied force processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive and force sensitive display (e.g., touch screen), graphics module 2028 includes components for rendering, displaying, and animating objects on the touch sensitive and force sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system, also sometimes referred to herein as "GPS"), a music player, and otherwise.

Touch and applied force processing module 2026 includes various software components for performing various tasks associated with touch I/O device 2012 including but not limited to receiving and processing touch input and applied force input received from I/O device 2012 via touch I/O device controller 2032.

System 2000 may further include fingerprint sensing module 2038 for performing fingerprint sensing.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input and applied force input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive and force-sensitive surface that accepts touch input and applied force input from the user. Touch I/O device 2012 and touch screen controller 2032 (along with any associated modules and/or sets of instructions in medium 2001) detects and tracks touches or near touches, and where applicable, force of those touches (and any movement or release of the touch, and any change in the force of the touch) on touch I/O device 2012 and converts the detected touch input and applied force input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad or trackpad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch, and applied force, input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

Further System Elements

In one embodiment, an example system includes a force sensor coupled to the touch I/O device 2012, such as coupled to a force sensor controller. For example, the force sensor controller can be included in the I/O subsystem 2006. The force sensor controller can be coupled to a processor or other computing device, such as the processor 2018 or the secure processor 2040, with the effect that information from the force sensor controller can be measured, calculated, computed, or otherwise manipulated. In one embodiment, the force sensor can make use of one or more processors or other computing devices, coupled to or accessible to the touch I/O device 2012, such as the processor 2018, the secure processor 2040, or otherwise. In alternative embodiments, the force sensor can make use of one or more analog circuits or other specialized circuits, coupled to or accessible to the touch I/O device 2012, such as might be coupled to the I/O subsystem 2006.

Internal Reflection

Figure 3:
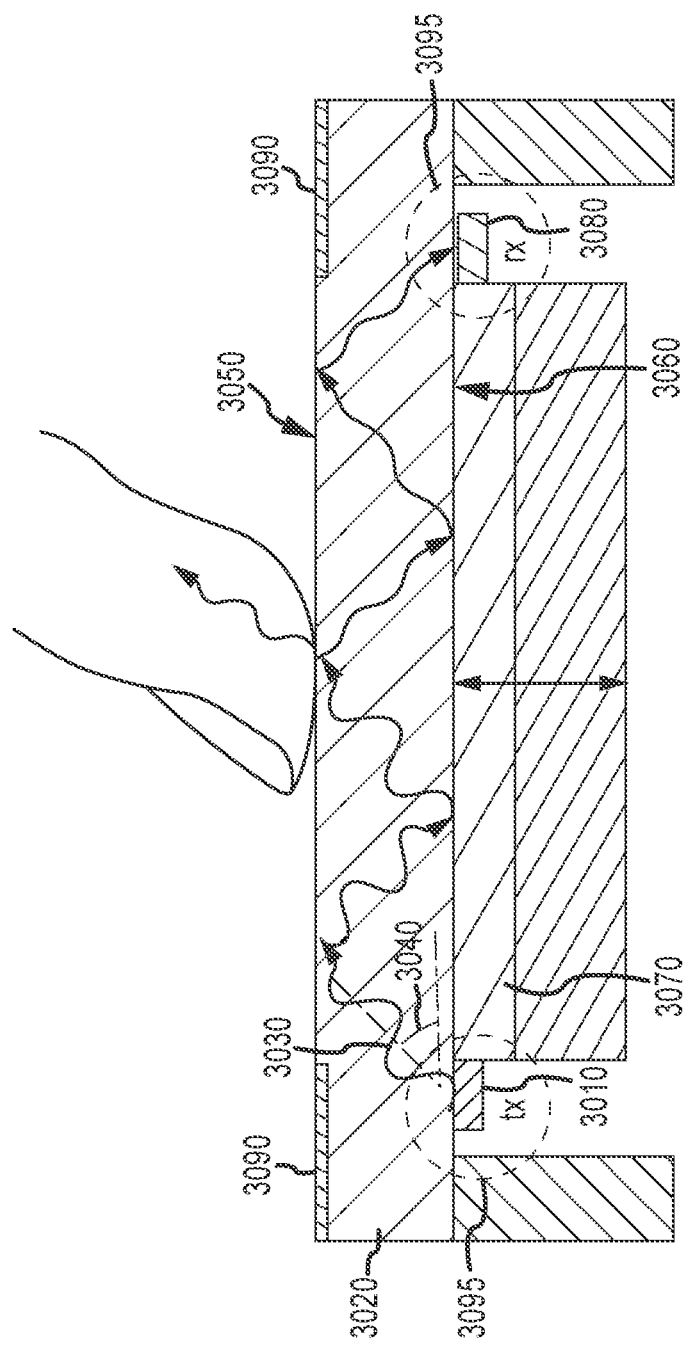
FIG. 3 shows a conceptual drawing of a system including internal reflection.

FIG. 3 shows a conceptual drawing of a system including internal reflection.

In one embodiment, the force sensor includes one or more infrared transmitters 3010, positioned below the cover glass (CG) 3020 and disposed to emit infrared light 3030 into the cover glass at an angle 3040. For example, the infrared light 3030 can be approximately 800 nanometers (nm) to approximately 850 nanometers (nm) in wavelength. However, in the context of the invention, there is no particular requirement for any particular wavelength. For example, relatively longer or shorter wavelengths of electromagnetic radiation would be workable, and are within the scope and spirit of the invention. Similarly, in the context of the invention, there is no particular requirement that the infrared light, or other electromagnetic radiation, need be limited to any one wavelength. For example, a set of wavelengths, or a range thereof, or wavelength selected within a tunable set thereof, would be workable, and are within the scope and spirit of the invention.

In one embodiment, the infrared light 3030, and the angle 3040, can be selected so that the infrared light 3030 is substantially 100% reflected from an interface between a first surface 3050 of the cover glass (the "top surface") and ambient air. Similarly, the angle 3040 can be selected so that the infrared light 3030 is also substantially 100% reflected from an interface between a second surface 3060 of the cover glass (the "bottom surface") and a device layer 3070 disposed immediately below the cover glass 3020 in a device stack (that is, a stack of such device layers). However, in the context of the invention, there is no particular requirement for any such limitation. For example, the infrared light 3030 and the angle 3040 can be selected so that internal reflection is distinguishable when the interface at the top surface 3050 is between the cover glass 3020 and ambient air, from when the interface at the top surface 3050 is between the cover glass 3020 and the user's finger (or other body part).

For example, in alternative embodiments, when other frequencies of electromagnetic radiation, or ultrasound, or other signaling elements, are used, the internal reflection might be substantially less than 100% when the interface at the top surface is between the cover glass 3020 and ambient air. In such cases, internal reflection can be substantially distinguishable from when the interface at the top surface 3050 is between the cover glass 3020 and the user's finger. Moreover, in the context of the invention, there is no particular requirement that internal reflection is necessarily less (rather than more) when the user's finger is present, so long as the touch I/O device 2012 can distinguish between absence of the user's finger and presence of the user's finger.

In one embodiment, the infrared light 3030 travels at the angle 3040 until it strikes the top surface 3050 of the cover glass 3020, where it is substantially internally reflected at the same angle. While this application primarily describes techniques in which the infrared light 3030 travels in substantially in a straight line, in the context of the invention, there is no particular requirement for any such limitation. For example, the cover glass 3020 can be doped, or have a varying density, or have other properties, which cause the path of the infrared light to curve. After internal reflection, the infrared light 3030 travels at substantially the angle 3040 until it strikes the bottom surface 3060 of the cover glass 3020, where it is again substantially internally reflected at the same angle. The bottom surface 3060 of the cover glass 3020 can provide an interface between the cover glass 3020 and another layer 3070 of a device stack, such as an optically clear adhesive (OCA), a pressure-sensitive adhesive (PSA), or otherwise. This repeats until the infrared light 3030 reaches one or more infrared receivers 3080, at which the infrared light 3030 is substantially absorbed and the amount of energy transmitted by means of internal reflection is measured.

While this application primarily describes techniques in which the infrared light 3030 travels at substantially the same angle 3040 for each straight line, in the context of the invention, there is no particular requirement for any such limitation. For a first example, the infrared light 3030 can be emitted at a different angle 3040 chosen depending on the choice of infrared transmitter 3010 or infrared receiver 3080.

For a second example, the infrared light 3030 can be emitted at a different angle 3040 chosen depending on a time. This could include a sweep through a set of selected angles 3040, or a range of angles 3040, in a round-robin fashion, with the effect of using substantially all those selected angles 3040, or range of angles 3040, during a selected time period. For a second example, the infrared light 3030 can be emitted at an angle 3040 that is tunable in response to some aspect of the ambient environment (such as humidity or temperature), some aspect of the user interface, or otherwise.

In one embodiment, when the infrared light 3030 strikes the top surface 3050 of the cover glass 3020, it is substantially 100% reflected when the top surface 3050 of the cover glass 3020 interfaces with ambient air, but is substantially less reflected when the top surface 3050 of the cover glass 3020 interfaces with the user's finger. This has the effect that the infrared receivers 3080 can determine whether the infrared light 3030, at some time in its path from the infrared transmitters 3010 to the infrared receivers 3080, was reflected from an interface at which the user's finger was present. As described above, in the context of the invention, there is no particular requirement for 100% reflection when the top surface 3050 of the cover glass 3020 interfaces with ambient air. For example, it might occur that the infrared light 3030 is less than 100% reflected, while internal reflection can be substantially distinguishable from when the interface at the top surface 3050 is between the cover glass 3020 and the user's finger. In such cases, the infrared receivers 3080 (or a computing device receiving a measure of received energy from the infrared receivers 3080) can still determine whether the infrared light 3030, at some time in its path from the infrared transmitters 3010 to the infrared receivers 3080, was reflected from an interface at which the user's finger was present.

HIDDEN INFRARED TRANSMITTERS AND RECEIVERS. In one embodiment, the infrared transmitters 3010 and the infrared receivers 3080 are positioned in locations where they cannot readily be seen by a user of the touch I/O device 2012.

In a first case, the infrared transmitters 3010 and the infrared receivers 3080 are positioned below an opaque ink barrier 3090, such as might be positioned at the top surface 3050 of the cover glass 3020, at a first edge of the cover glass 3020 (such as for the infrared transmitters 3010) and a second edge of the cover glass 3020 (such as for the infrared receivers 3080), or around the periphery of the cover glass 3020. This has the effect that, when the user observes the top surface 3050 of the cover glass 3020, the user cannot readily see the infrared transmitters 3010 or the infrared receivers 3080, because the infrared transmitters 3010 and the infrared receivers 3080 are positioned below the opaque ink barrier 3090, which prevents the user from readily seeing the infrared transmitters 3010 or the infrared receivers 3080.

In a second case, the infrared transmitters 3010 and the infrared receivers 3080 are positioned in one or more regions 3095 that are below and to one side of the cover glass 3020, with the effect that the infrared transmitters 3010 and the infrared receivers 3080 are not readily visible to the user's eye. For example, the infrared transmitters 3010 and the infrared receivers 3080 can be positioned below an opaque substrate, which is itself relatively below the cover glass 3020. The opaque substrate can include a frame element positioned below the cover glass 3020, or can include an opaque element in the device stack positioned below the cover glass 3020.

In such cases, the infrared transmitters 3010 are positioned so that the angle 3040 at which the infrared light 3030 is transmitted is sufficient that the infrared light 3030 leaves the one or more regions 3095, so as to strike the top surface 3050 of the cover glass 3020 from those one or more regions 3095. Similarly, in such cases, the angle 3040 at which the infrared light 3030 is transmitted is also sufficient that the infrared light 3030 enters the one or more regions 3095 after having been reflected from the top surface 3050 of the cover glass 3020, with the effect that the infrared receivers 3080 are positioned to receive the infrared light 3030 after it is reflected. This would have the effect that the user's eye cannot see the infrared transmitters 3010 or the infrared receivers 3080 due to lack of any optically clear path between the user's eye and either the infrared transmitters 3010 or the infrared receivers 3080.

Alternatively, in such cases, the infrared transmitters 3010 and the infrared receivers 3080 can be positioned so that the infrared light 3030 passes through one or more vias, or other passageways, in a substantially opaque substrate below the cover glass 3020. Also alternatively, the substrate below the cover glass 3020 can be made substantially opaque to visible light but substantially transmissive to the infrared light 3030. This would have the effect that the user would not be able to see either the infrared transmitters 3010 or the infrared receivers 3080, due to lack of any optically clear path between the user's eye and either the infrared transmitters 3010 or the infrared receivers 3080.

In a third case, the infrared transmitters 3010 and the infrared receivers 3080 can be positioned in an organic light emitting diode (OLED) layer (not shown), or at least a portion thereof, positioned below the cover glass 3020. In such cases, one or more designated color elements of the OLED layer can be adjusted to include an infrared transmitter 3010 instead of one of the ordinary visible colors (such as red, green, or blue). This would have the effect that the designated color element of the OLED layer would transmit infrared light 3030 instead of emitting one of the ordinary visible colors. In alternative embodiments, the designated color element of the OLED layer would transmit infrared light 3030 as a "fourth color", instead of being turned off (such as to indicate a black color element). In such cases, the user's eye would not be able to detect the infrared light 3030, as infrared light 3030 is outside the visible spectrum detectable by the human eye. Moreover, when infrared transmitters 3010 are integrated into the OLED display, they would be outshone by the display (when color or greyscale display is present) or they would appear black (when color or greyscale display is not present).

In such cases, the infrared transmitter 3010 would be positioned so that it would transmit infrared light 303 at the angle 3040 indicated above, rather than directly to the user's eye. Similarly, in such cases, one or more designated color elements of the OLED layer can be adjusted to include an infrared receiver 3080 instead of a transmitter for one of the ordinary visible colors, with the effect that the designated color element of the OLED layer would receive infrared light 3030 instead of emitting one of the ordinary visible colors. In such cases, only a relatively very few of the color elements of the OLED layer would be selected for these purposes. This would have the effect, as only a relatively very few of the color elements of the OLED layer would be selected for these purposes, that the user's eye would not be able to readily discern which of the color elements of the OLED layer had been selected for these purposes.

Multiple Reflection Detectors

Figure 4A:
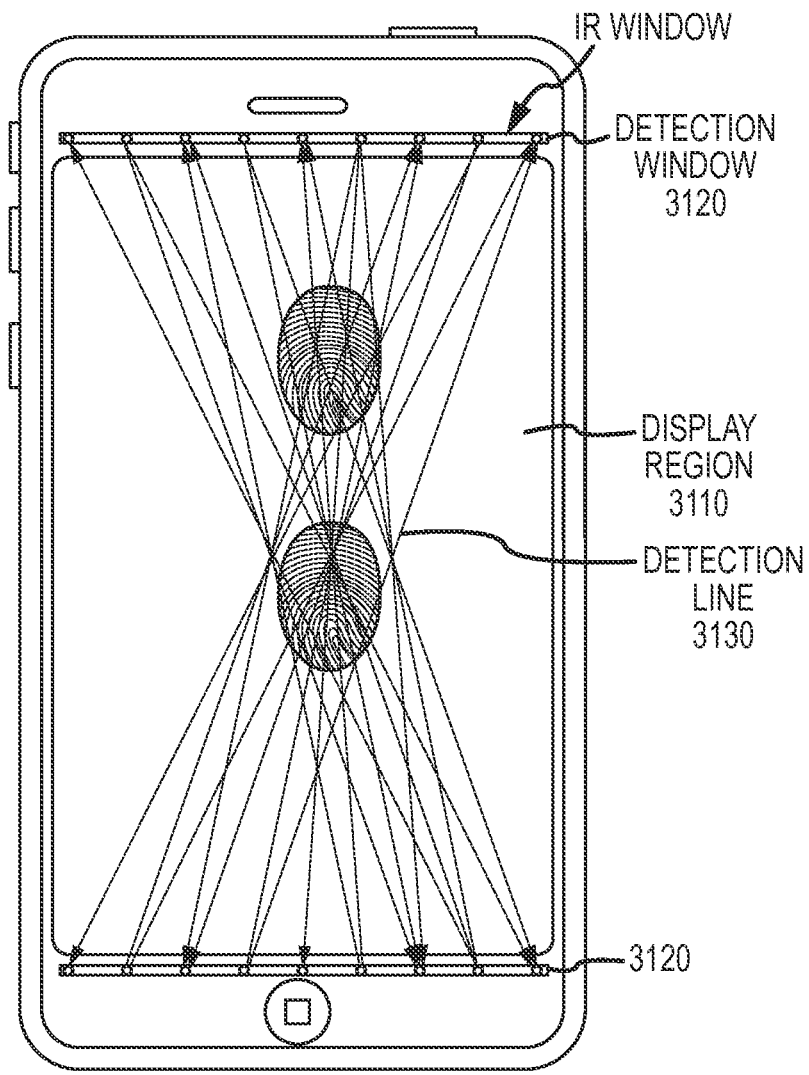
FIG. 4A shows a first conceptual drawing of a pattern of infrared transmitters and receivers.

FIG. 4A shows a conceptual drawing of a first pattern of infrared transmitters and receivers.

Figure 4B:
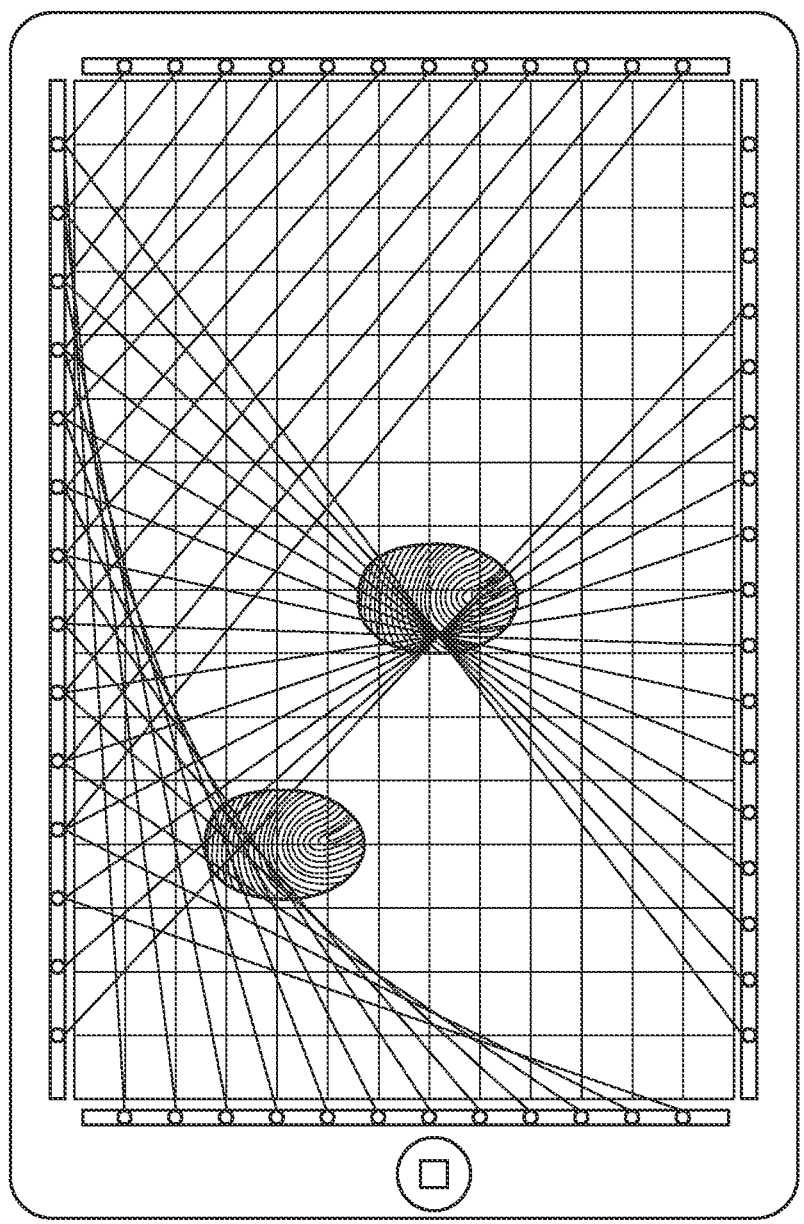
FIG. 4B shows a second conceptual drawing of a pattern of infrared transmitters and receivers.

FIG. 4B shows a conceptual drawing of a second pattern of infrared transmitters and receivers.

In one embodiment, a touch I/O device 2012 includes a display region 3110 and two or more detection windows 3120 positioned outside, or at edges of, the display region 3110. For example, the detection windows 3120 can be positioned so that infrared light 3030 is transmitted along one or more detection lines 3130. Each detection line 3130 originates at one or more infrared transmitters 3010 and terminates at one or more infrared receivers 3080. In one embodiment, each detection line 3130 can originate at a single infrared transmitter 3010 and terminates at a single infrared receiver 3080.

In alternative embodiments, a single infrared transmitter 3010 can send infrared light 3030 to more than one infrared receiver 3080, such as in a broadcast of infrared light 3030 from that one infrared transmitter 3010 to those more than one infrared receivers 3080, with the effect of providing a detection line 3130 from that one infrared transmitter 3010 to each of those more than one infrared receivers 3080. Moreover, after reading this application, those of ordinary skill in the art would recognize many other alternatives for providing detection lines 3130 that would be workable, are within the scope and spirit of the invention, and would not require further invention or undue experiment.

Moreover, infrared light 3030 sent from one or more infrared transmitters 3010 to one or more infrared receivers 3080 can be distinguished by the time at which that infrared light 3030 was sent or received. For example, infrared light 3030 can be sent at different times from one or more infrared transmitters 3010, with the effect that it is received at different times at one or more infrared receivers 3080. For example, a sending time for infrared light 3030 can sweep through a set of selected times, or a range of times, in a round-robin fashion, with the effect of using a set of those selected times, or range of times, during a selected time period. This can have the effect that the touch I/O device 2012 can determine which detection line 3130 was attenuated (or otherwise affected) by the user's finger, in response to a timing of the infrared light 3030.

While this application primarily describes detection of the user's finger in response to infrared light 3030, in the context of the invention, there is no particular requirement for any such limitation. For example, infrared light 3030 (or another electromagnetic signal) can be augmented or replaced by an acoustic or other signal, such as an ultrasonic signal. In such cases, the acoustic signal could be sent by one or more transmitters similar to the infrared transmitters 3010 and detected by one or more receivers similar to the infrared receivers 3080. In such cases, multiple such signals could be coordinated so that they are sent from multiple transmitters (even if at different times), reach the same receiver, and can be attenuated during travel; the attenuated signals can be summed or otherwise coordinated in response to the receiver, with the effect that a collective set of receivers can gather information on where and how forcefully the user's finger contacts the touch I/O device 2012.

In one embodiment, such as shown in the FIG. 4A, the detection windows 3120 can be positioned on a first side and a second side of the display region 3110, such as positioning a first detection window 3120 near an on/off button 3140 and positioning a second detection window 3120 near a speaker element 3150, such as might be found in a mobile phone type of touch I/O device 2012. For a first example, the infrared transmitters 3010 can be positioned in the first detection window 3120 and the infrared receivers 3080 can be positioned in the second detection window 3120. For a second example, the infrared transmitters 3010 and the infrared receivers 3080 can be positioned so that both the first detection window 3120 and the second detection window 3120 each have infrared transmitters 3010 and infrared receivers 3080.

In one embodiment, such as shown in the FIG. 4B, the detection windows 3120 can be positioned on additional sides of the display region 3110, such as might be found in a touchpad type of touch I/O device 2012. For example, in a touchpad type of touch I/O device 2012, the detection windows 3120 can be included in the touch I/O device 2012 on all four sides of the display region 3110. For a first example, the infrared transmitters 3010 can be separately positioned in one or more selected ones of the detection windows 3120, and the infrared receivers 3080 can be separately positioned in one or more other ones of the detection windows 3120. For a second example, the infrared transmitters 3010 and the infrared receivers 3080 can be positioned so that one or more of the detection windows 3120 have both infrared transmitters 3010 and infrared receivers 3080 positioned therein.

In one embodiment, as described above, each detection line 3130 could be non-intercepted or intercepted. If non-intercepted, the infrared light 3030 on that detection line 3130 does not suffer attenuated reflection, and the infrared receptor 3080 associated with that detection line 3130 detects that the detection line 3130 is non-intercepted. If intercepted, the infrared light 3030 on that detection line 3130 does suffer attenuated reflection, and the infrared receptor 3080 associated with that detection line 3130 detects that the detection line 3130 is intercepted.

This has the effect that when the detection line 3130 is intercepted, such as when the user's finger applies force to, or touches, the display region 3110 across that detection line 3130, the infrared receptor 3080, and the touch I/O device 2012, are able to determine that the detection line 3130 has been intercepted. Moreover, the infrared receptor 3080, and the touch I/O device 2012, can determine, by the amount of attenuated reflection, the amount of the detection line 3130 that has been intercepted. This could be due to an area of the user's finger that intercepts the detection line 3130, a number of fingerprint ridges of the user's finger that are intercept the detection line 3130, a degree of wetting of the user's finger in an area that intercepts the detection line 3130, a measure of optical coupling between the user's finger in an area that intercepts the detection line 3130, or another measurement with respect to the detection line 3130.

In one embodiment, the touch I/O device 2012 can determine, from the position of multiple detection lines 3130, the location and size of each place at which the user's finger has applied force, or touched, the touch I/O device 2012. For example, a first fingerprint would intercept a first set of detection lines 3130, while a second fingerprint would intercept a second set of detection lines 3130. Using this information, the touch I/O device 2012 can determine whether there is a single such fingerprint, or more than one such fingerprint. Moreover, if there is more than one such fingerprint, the touch I/O device 2012 can determine whether a first such fingerprint is shadowing a second such fingerprint.

In one embodiment, in response to the area of each fingerprint, the number of fingerprint ridges of the user's finger in each fingerprint, the degree of wetting of the user's finger in the area of each fingerprint, the measure of optical coupling between the user's finger in the area of each fingerprint, and other measurements with respect to each fingerprint, the touch I/O device 2012 can determine an amount of applied force by the user's finger at the location of each fingerprint.

Capacitive Detection Assistance

In one embodiment, the touch I/O device 2012 also has one or more capacitive detectors that can determine whether the user's finger is contacting the touch I/O device 2012, and if so, where that contact occurs. For example, if the user's finger is contacting the touch I/O device 2012, the touch I/O device 2012 can use information provided by the one or more capacitive sensors to determine where that contact is occurring.

In one embodiment, the touch I/O device 2012 can determine whether attenuated reflection on one or more detection lines 3130 is due to a single user's finger, or due to more than one user's finger, or due to no user fingers at all, contacting the touch I/O device 2012.

For a first example, it might occur that more than one user's finger is contacting the touch I/O device 2012, in an overlapping region, with the effect of appearing as if a single user's finger is contacting the touch I/O device 2012 with a relatively large amount of applied force. The touch I/O device 2012 can use information from the one or more capacitive sensors to determine if there is a single user's finger, or more than one user's finger, contacting the touch I/O device 2012. In either such case, the touch I/O device 2012 can use that information to determine an amount of force being applied by either the single user's finger, or more than one user's finger, contacting the touch I/O device 2012.

For a second example, it might occur that more than one user's finger is contacting the touch I/O device 2012, but the location of the two fingers are shadowing each other. In such cases, one or more detection lines 3130 would pass through the coupling by each finger to the touch I/O device 2012. The touch I/O device 2012 can use information from the one or more capacitive sensors to determine where the more than one user's fingers are contacting the touch I/O device 2012, with the effect of being able to determine whether the location of the two fingers are shadowing each other. In the event that the two fingers are shadowing each other, the touch I/O device 2012 would be able to use information from the one or more capacitive sensors to determine where the shadowing occurs, with the effect that the touch I/O device 2012 would be able to determine which ones of the detection lines 3130 are subject to attenuated reflection from more than one user's finger, and which ones are not.

For a third example, it might occur that one or more user's fingers have contacted the touch I/O device 2012 in the past, and have left behind some form of optical coupling at the top surface 3050 of the cover glass 3020, such as a fingerprint, smudge, or wetting of the top surface 3050 of the cover glass 3020. If the user's finger has left behind a fingerprint, smudge, or wetting of the top surface 3050 of the cover glass 3020, one or more of the detection lines 3130 might suffer attenuated reflection, even if there is no force being applied to the cover glass 3020 at that moment. In this event, the touch I/O device 2012 would be able to use information from the one or more capacitive sensors to determine whether there is in fact any contact by the user's finger. The touch I/O device 2012 would be able, in response to that information, to determine whether the attenuated reflection is due to actual contact, or instead due to a fingerprint, smudge, or wetting.

With respect to this third example, moreover, in one embodiment, the touch I/O device 2012 can use information from the one or more capacitive sensors to determine an amount of attenuated reflection that indicates a baseline value for a known applied force. For a first example, if the one or more capacitive sensors determine that there is no contact between the user's finger and the touch I/O device 2012 at a particular location, and there is a relatively minimum amount of attenuated reflection at that particular location, the touch I/O device 2012 can determine that the amount of detected attenuated reflection is representative of substantially zero applied force at that particular location. For a second example, if the one or more capacitive sensors determine that there is no contact between the user's finger and the touch I/O device a that particular location, but there is at least some attenuated reflection at that particular location, the touch I/O device 2012 can determine that the amount of detected attenuated reflection is still representative of substantially zero applied force at that particular location, and can attribute the detected attenuated reflection to a fingerprint, smudge, or wetting.

In one embodiment, the touch I/O device 2012 can periodically, aperiodically, or otherwise from time to time, select a particular location on the top surface 3050 of the cover glass 3020, and determine a new baseline for applied force for that particular location. For example, the touch I/O device 2012 can from time to time, select a particular location, determine an amount of attenuated reflection at that particular location, and determine whether capacitive sensing indicates a contact at that particular location. If there is no contact at that particular location, the touch I/O device 2012 can adjust its baseline for zero applied force in response to the amount of attenuated reflection at that particular location, noting that the amount of attenuated reflection is not due to any applied force or contact. Similarly, if there is a contact at that particular location, the touch I/O device 2012 can adjust its baseline for applied force in response to the amount of attenuated reflection at that particular location, noting that the amount of attenuated reflection is in fact due to at least some applied force or contact.

In one embodiment, capacitive sensing of touching of the touch I/O device 2012 by the user's finger can be used to determine specifically where on the top surface of the user's finger is actually touching the touch device. As described above, the touch I/O device can use information from the one or more capacitive sensors to determine whether the area of the user's finger contacting the top surface 3050 of the cover glass 3020 is representative of just one user's finger, or more than one user's finger. In response thereto, the touch I/O device 2012 can determine whether the area impressed by the user's finger on the top surface 3050 of the cover glass 3020 is representative of a relatively light amount of applied force (such as a relatively light force by each of two fingers), or a relatively heavy amount of a applied force (such as a relatively heavy force by only one finger).

Alternative Embodiments

While this application primarily describes techniques in which infrared light is used to determine attenuation at a surface of the cover glass (that is, at an interface between the cover glass and either air or the user's finger), in the context of the invention, there is no particular requirement for any such limitation. For example, FTIR techniques can be used with internal reflection of other signals, including ultrasound, ultraviolet light, or otherwise.

As described above, while this application primarily describes techniques in which reflection is substantially unattenuated when there is no applied force or contact by the user's finger, in the context of the invention, there is no particular requirement for any such limitation. For example, reflection can be attenuated even when there is no applied force or contact, but is attenuated more (or less) when there is at least some applied force or contact. In such cases, the touch I/O device 2012 can determine whether there is applied force or contact, and how much, by a difference between attenuated reflection in response to applied force or contact, or lack thereof.

For a first example, frustrated total internal reflection (FTIR) can be measured with respect to ultrasonic signals which are reflected by the top surface 3050 and by the bottom surface 3060 of the cover glass 3020. Although ultrasonic signals are attenuated at the top surface 3050 even when the interface is between the cover glass 3020 and ambient air, there is a difference between an amount of attenuation when the interface is between the cover glass 3020 and ambient air, and when the interface is between the cover glass 3020 and the user's finger.

For a second example, frustrated total internal reflection (FTIR) might have a different amount of attenuated reflection in response to a temperature of the ambient air, when the interface at the top surface 3050 is between the cover glass 3020 and the ambient air. Although the amount of attenuated reflection might differ in response to the temperature of the ambient air, the touch I/O device 2012 would be able to determine whether the attenuated reflection is due to an interface between the top surface 3050 of the cover glass 3020 and ambient air, or between the top surface 3050 and the user's finger.

After reading this application, those skilled in the art would recognize that techniques for obtaining information with respect to applied force and contact on a touch I/O device, and using that associated information to determine amounts and locations of applied force and contact on a touch I/O device, is responsive to, and transformative of, real-world data such as attenuated reflection and capacitive sensor data received from applied force or contact by a user's finger, and provides a useful and tangible result in the service of detecting and using applied force and contact with a touch I/O device. Moreover, after reading this application, those skilled in the art would recognize that processing of applied force and contact sensor information by a computing device includes substantial computer control and programming, involves substantial records of applied force and contact sensor information, and involves interaction with applied force and contact sensor hardware and optionally a user interface for use of applied force and contact sensor information.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. An electronic device comprising:
a substrate formed from an optically transparent material and comprising a top surface;
a first light emitter positioned to emit a first light into the substrate;
a first light detector positioned to detect a first amount of light received at the detector after being emitted by the first light emitter into the substrate and reflected, at least once, from the top surface of the substrate;
a second light emitter positioned to emit a second light into the substrate;
a second light detector positioned to detect a second amount of light received at the detector after being emitted by the second light emitter into the substrate and reflected, at least once, from the top surface of the substrate;
a processor in communication with the first light emitter, the second light emitter, the first light detector, and the second light detector; and
a touch sensor in communication with the processor and configured to detect a touch location at which a user touches the top surface of the substrate; wherein
the processor is configured to:
determine a first measurement of attenuation of the first amount of light received at the first detector;
determine a second measurement of attenuation of the second amount of light received at the second detector; and
determine a force quantity corresponding to an amount of force applied by the user to the top surface at the touch location based on the first measurement of attenuation of the first amount of light, the second measurement of attenuation of the second amount of light, and the touch location.

2. The electronic device of claim 1, wherein the second light emitter is positioned adjacent to the first light emitter.

3. The electronic device of claim 2, wherein the second light detector is positioned adjacent to the first light detector.

4. The electronic device of claim 1, wherein the processor comprises a fingerprint sensing module configured to obtain an image of a fingerprint of the user.

5. The electronic device of claim 1, wherein the first light emitter and the first light detector are positioned on opposed sides of the substrate.

6. The electronic device of claim 1, wherein the first light emitter and the first light detector are positioned below an opaque layer disposed on the top surface.

7. The electronic device of claim 1, wherein:
the first light emitter is configured to emit light in an infrared frequency band; and
the first light detector is configured to detect light in the infrared frequency band.

8. The electronic device of claim 1, wherein:
the first light is emitted at a selected angle such that the first light undergoes total internal reflection from an interface between the top surface and ambient air.

9. The electronic device of claim 8, wherein the angle is further selected so that the first light is attenuated after reflection from an interface between the top surface and a body part of the user.

10. The electronic device of claim 1, wherein:
the first light emitter is configured to emit the first light to traverse the substrate in a first generally linear direction; and
the second light emitter is configured to emit the second light to traverse the substrate in a second generally linear direction that differs from the first generally linear direction.

11. A method of measuring a force applied to a touch-sensitive input device, the method comprising:
emitting a first infrared light within a substrate of the touch-sensitive input device toward an outer surface at a first selected angle, the outer surface defining a portion of an exterior of the touch-sensitive input device;
measuring a first amount of the first infrared light received at a first light detector after being reflected from the outer surface of the substrate;
emitting a second infrared light within the substrate toward the outer surface at a second selected angle;
measuring a second amount of the second infrared light received at a second light detector after being reflected from the outer surface of the substrate;
determining, by a capacitive sensor, a touch location at which a user touches the outer surface; and
determining a force quantity corresponding to an amount of force applied by the user to the touch location based, at least in part, on the first amount of the first infrared light measured, the second amount of the second infrared light measured, and the touch location.

12. The method of claim 11, further comprising emitting the first infrared light along an optical path such that the first infrared light reflects, at least once, from the outer surface.

13. An electronic device comprising:
a display comprising a perimeter;
a substrate positioned over the display, formed from an optically transparent material, and comprising a top surface and a bottom surface;
a first number of light emitters positioned on a first side of the perimeter of the display and comprising a first light emitter, the first light emitter configured to emit a first light into the substrate, toward the top surface, at a first angle selected so that at least a portion of the emitted light reflects off the top surface and the bottom surface at least once, thereby traversing the substrate in a first generally linear direction;
a second number of light emitters positioned on a second side of the perimeter of the display and comprising a second light emitter, the second light emitter configured to emit a second light into the substrate, toward the top surface, at a second angle selected so that at least a portion of the emitted light reflects off the top surface and the bottom surface at least once, thereby traversing the substrate in a second generally linear direction;
a first light detector positioned on the perimeter of the display, opposite the first number of light emitters, the first light detector configured to detect a first amount of the first light emitted by the first light emitter along the first generally linear direction and received by the first light detector;
a second light detector positioned opposite the second number of light emitters, the second light detector configured to detect a second amount of the second light emitted by the second light emitter along the second generally linear direction and received by second light detector;
a processor in communication with the first light emitter, the second light emitter, the first light detector, and the second light detector, the processor configured to:
 determine a first measurement of attenuation of the first light that occurs while the first light traverses the substrate in the first generally linear direction, and
 determine a second measurement of attenuation of the second light that occurs while the second light traverses the substrate in the second generally linear direction;
a touch sensor in communication with the processor and configured to detect a touch location at which a user touches the top surface of the substrate; wherein
the processor is configured to determine a force quantity corresponding to an amount force applied by the user to the top surface of the substrate at the touch location based on the first measurement of attenuation of the first light, the second measurement of the attenuation of the second light, and the touch location.

14. The electronic device of claim 13, wherein the first light detector is configured to detect the first light in an infrared frequency band.

15. The electronic device of claim 13, wherein the first light emitter is configured to emit the first light in an infrared frequency band.

16. The electronic device of claim 13, wherein the first light emitter is configured to selectably change the first angle at which the first light is emitted therefrom.

17. A method of determining force applied to an outer surface of a touch-sensitive input device, the method comprising:
 obtaining, by a capacitive sensor, an area of a touch by a user to the outer surface of the touch-sensitive input device;
 emitting a first light into a substrate within the touch-sensitive input device along a first generally linear direction that intersects the area;
 emitting a second light into the substrate along a second generally linear direction that intersects the area;
 obtaining a first measurement of a first attenuated reflection of light associated with the first light;
 obtaining a second measurement of a second attenuated reflection of light associated with the second light; and
 determining a force quantity corresponding to an amount of force applied by the user to the area based, at least in part, on the first and the second measurements of the first and the second attenuated reflections.

18. The method of claim 17, wherein the first light comprises infrared light and the first generally linear direction comprises an optical path that reflects at least once from the outer surface.

19. The method of claim 17, further comprising detecting the first attenuated reflection of light after the first light has reflected, at least once, from the outer surface.

20. The method of claim 17, wherein the first light is emitted into a first side of the substrate and the second light is emitted into a second side of the substrate.

* * * * *